(12) United States Patent
Stenzel et al.

(10) Patent No.: US 12,417,285 B2
(45) Date of Patent: Sep. 16, 2025

(54) SYSTEM AND METHODS FOR DETECTING A COPY OF A DEEP NEURAL NETWORK IN A HEARING DEVICE

(71) Applicant: Sonova AG, Staefa (CH)

(72) Inventors: Sebastian Stenzel, Staefa (CH); Sebastian Kroedel, Staefa (CH); Claudio Santelli, Staefa (CH); Christos Dimopoulos, Zurich (CH); Harald Krueger, Affoltern am Albis (CH)

(73) Assignee: Sonova AG, Staefa (CH)

( * ) Notice: Subject to any disclaimer, the term of this patent is extended or adjusted under 35 U.S.C. 154(b) by 239 days.

(21) Appl. No.: 18/104,144

(22) Filed: Jan. 31, 2023

(65) Prior Publication Data

US 2024/0256665 A1      Aug. 1, 2024

(51) Int. Cl.
*G06F 21/56* (2013.01)
*G06N 3/08* (2023.01)

(52) U.S. Cl.
CPC ............. *G06F 21/566* (2013.01); *G06N 3/08* (2013.01); *G06F 2221/033* (2013.01)

(58) Field of Classification Search
CPC .... G06F 21/566; G06F 2221/033; G06N 3/08
See application file for complete search history.

(56) References Cited

U.S. PATENT DOCUMENTS

| 10,897,675 | B1 | 1/2021 | Tsitovich |
| 11,687,623 | B2 * | 6/2023 | Wu ........................ G06N 3/063 726/26 |
| 11,861,816 | B2 * | 1/2024 | Kim ........................ G06N 3/08 |
| 2007/0286429 | A1 | 12/2007 | Grafenberg et al. |
| 2019/0370440 | A1 | 12/2019 | Gu et al. |
| 2020/0184036 | A1 * | 6/2020 | Wu ........................ G06F 21/60 |
| 2020/0184044 | A1 | 6/2020 | Zatloukal |
| 2020/0233936 | A1 | 7/2020 | Veshchikov et al. |
| 2020/0268260 | A1 | 8/2020 | Tran |
| 2021/0074266 | A1 * | 3/2021 | Lu ........................ G10L 15/063 |

(Continued)

FOREIGN PATENT DOCUMENTS

| CN | 111738411 A | 10/2020 |
| WO | 2020173252 A1 | 9/2020 |
| WO | 2022081553 A1 | 4/2022 |

OTHER PUBLICATIONS

Li et al., "A survey of deep neural network watermarking techniques," Neurocomputing, vol. 461, 21, Oct. 2021 pp. 171-193.

(Continued)

*Primary Examiner* — Techane Gergiso
(74) *Attorney, Agent, or Firm* — Sterne, Kessler, Goldstein & Fox P.L.L.C.

(57) ABSTRACT

System and methods are presented for detecting an authentic copy of a deep neural network in a device without reverse engineering the device. For example, the device can be a hearing device. A method is presented that includes providing audio signals to a deep neural network located in a hearing device, receiving signals from the deep neural network that are triggered by the transmitted audio signals, and determining whether the received signals were the expected signals. Specifically, the system can determine that an unauthorized entity embedded an unauthorized copy of the deep neural network in a hearing device.

26 Claims, 4 Drawing Sheets

(56) References Cited

U.S. PATENT DOCUMENTS

| | | | |
|---|---|---|---|
| 2021/0185465 A1* | 6/2021 | Bramsløw | H04R 25/507 |
| 2021/0281958 A1 | 9/2021 | Diehl et al. | |
| 2022/0093118 A1 | 3/2022 | Diehl et al. | |
| 2022/0095061 A1 | 3/2022 | Diehl et al. | |
| 2022/0159403 A1* | 5/2022 | Sporer | H04R 5/04 |
| 2022/0256294 A1 | 8/2022 | Diehl et al. | |
| 2023/0362559 A1* | 11/2023 | Bhowmik | H04R 25/507 |

OTHER PUBLICATIONS

Chen et al., "Speech Pattern Based Black-Box Model Watermarking for Automatic Speech Recognition," ICASSP 2022-2022 IEEE International Conference on Acoustics, Speech and Signal Processing (ICASSP), May 2022, 5 pages.

Chen et al., "SpecMark: A Spectral Watermarking Framework for IP Protection of Speech Recognition Systems," Proc. Interspeech 2020, Oct. 2020, 5 pages.

Wang et al., "Protecting the Intellectual Property of Speaker Recognition Model by Black-Box Watermarking in the Frequency Domain," Symmetry 2022, 14, 619, Mar. 20, 2022, 10 pages.

\* cited by examiner

SYSTEM AND METHODS FOR DETECTING A COPY OF A DEEP NEURAL NETWORK IN A HEARING DEVICE

BACKGROUND

Field

Aspects of the present disclosure relate to detecting a copy of a deep neural network, and in particular the copy being detectable using audio signals.

Background

As hearing devices have developed, deep neural networks (DNN) have become essential to their functionality. Essentially, hearing devices support hearing activity, but their capabilities have expanded as DNN have allowed information processing to be more accessible and advanced. DNN implemented in hearing devices can be used to support noise reduction, sound scene classification, natural language interface, transcription, foreign language translation, and other aspects that would improve the functionality of a hearing device. An important aspect of hearing devices are their ability to transmit intelligible audio to the receiver. Increasing intelligibility of audio received by a hearing device can be performed through noise reduction, also known as denoising. The goal of noise reduction is to reduce or even eliminate noise that will decrease intelligibility of the desired audio and may be performed using a DNN.

DNNs use representation learning and complex mathematical modeling to process data. DNNs typically have at least two layers of neural networks in order to learn more complex patterns. A ready for use DNN consists of its network architecture and corresponding parameters and weights that are trained during a training process with a dedicated data set. In some aspects, the dedicated data set may be considered big data (e.g., terabytes of data). The collection and processing of the training data and finding an optimal network topology involve extensive search and optimization processes. Additionally, training a neural network is computationally intensive and requires significant power consumption. Because of this, the design and training of neural networks is costly and laborious.

SUMMARY

There is a necessity for a system and method that would allow for the detection of a copied DNN.

In an aspect, a method is used to detect a copied deep neural network in a hearing device. In the method, a challenge signal is provided to a deep neural network and in response, an output from the deep neural network is received. Using the output, it can be determined if the output contains a predetermined response to the challenge signal.

In an aspect, a system is used to detect a copied deep neural network in a hearing device. The system includes a transmitter configured to transmit a challenge signal into a deep neural network, a receiver configured to receive an output from the deep neural network, and a verifying device configured to determine whether the output contains a predetermined response to the challenge signal.

Further aspects, features, and advantages of the present invention, as well as the structure and operation of the various aspects of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The aspects will be described with reference to the accompanying drawings. The drawing in which an element first appears is typically indicated by the leftmost digit(s) in the corresponding reference number.

DETAILED DESCRIPTION

Figure 1:
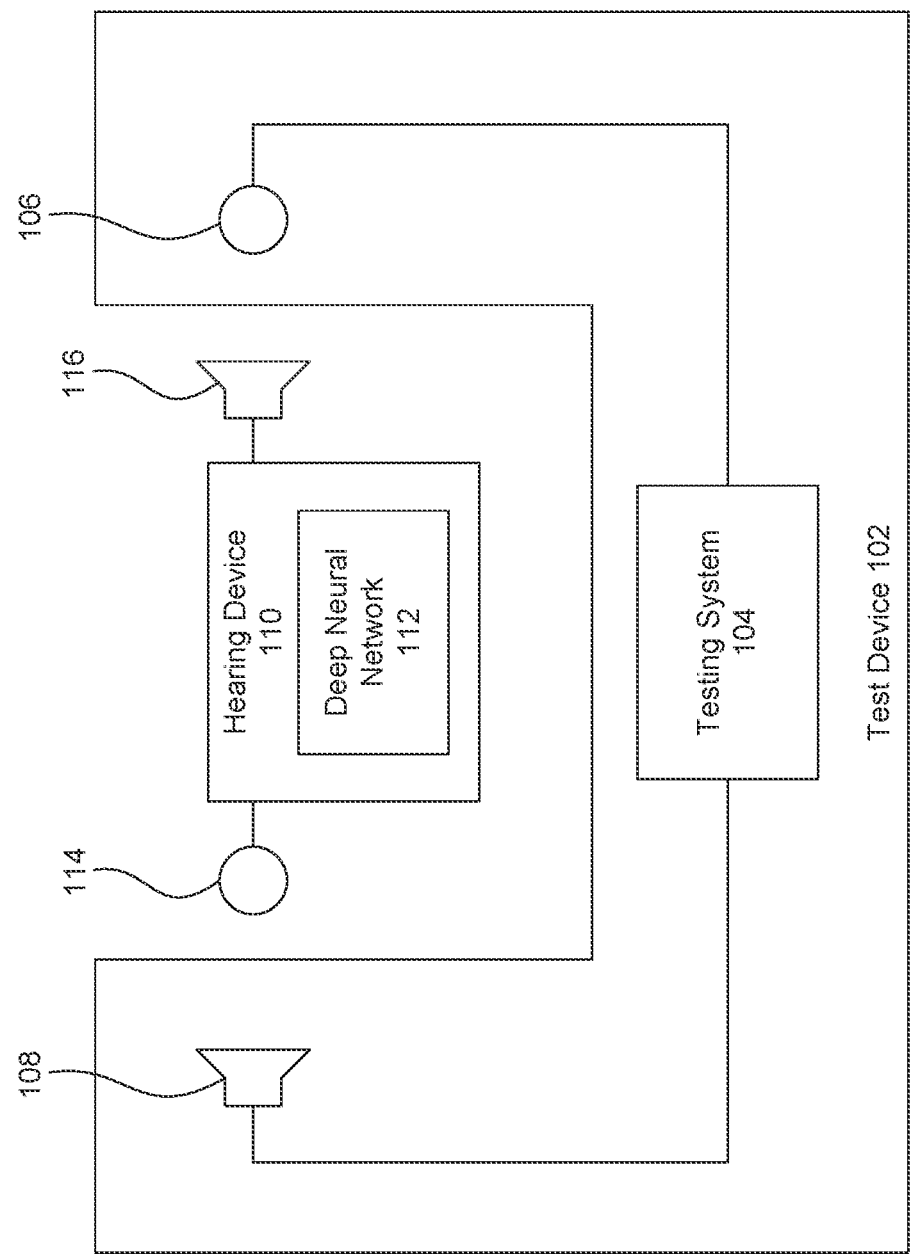
FIG. 1 is a diagram illustrating a system that detects an authentic deep neural network in a hearing device, according to some aspects.

Aspects relate to detecting a copy of a deep neural network embedded in a hearing device. In the detailed description that follows, references to "one aspect", "an aspect", "an example aspect", etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to effect such feature, structure, or characteristic in connection with other aspects whether or not explicitly described.

With the increasing use of neural networks in developing technology, there is concern of competitors copying or counterfeiting a proprietary developed and trained neural network and using it in their own products. The copying or counterfeiting of the developed neural network can occur, for example, when a technology is reverse engineered, a hacker gets access to development computers, or an entity illegally sells or otherwise passes on the data. The copied neural network could consequently be a slavish imitation of the stolen neural network and could copy every feature of the neural network, even mistakes. These slavish imitations can be difficult to detect because of the nature of neural networks. In order to access a DNN that is embedded in a device, reverse engineering of the device or access to the development computers may be performed. In some aspects, attempts to detect a copied DNN have included training a DNN to classify a digital marker, watermarking data by embedding the digital marker into the data, and assessing the DNN's classification of the watermarked data to determine a copied DNN. In some aspects, there is no access to a DNN's classification scheme if it is embedded in a device. In some aspects, the DNN will not use a classification scheme, for example in a denoising DNN. This is why a new method must be developed for detecting a copied DNN in a device.

Provided herein are exemplary methods and systems for detecting a copied deep neural network (DNN) that is embedded in a device, specifically a hearing device. In some aspects, the DNN's essential function is noise reduction. Noise reduction may significantly decrease or eliminate background noise from audio signals received by the hearing device without significantly affecting the quality of the audio signal. In some aspects, if the DNN is copied and used in another organization's device, it is difficult to determine if it was stolen because reverse engineering of hardware and/or software would be required to have access to the other organization's device and DNN. In some aspects, verification and authentication of a DNN created as discussed should not affect or compromise the performance of the noise reduction and also should not require reverse engineering of the device with the DNN being tested. In some aspects, a DNN can be trained to respond to a challenge signal and generate an output that is detected and processed, while the DNN continues to perform its essential function of noise reduction.

FIG. 1 shows a system 100, according to some aspects. For example, system 100 can be used to detect whether a DNN embedded in a device, e.g., a hearing device, is authentic. In some aspects, an authentic DNN can also refer to being a copy of the DNN which is authorized, in contrast to a non-authentic DNN which refers to an unauthorized copy of the DNN. In one example, system 100 comprises a test device 102 and a hearing device 110. In one example, test device 102 comprises a testing system 104, an input device 106 and an output device 108. In one example, hearing device 110 includes a DNN 112, an input device 114, and an output device 116.

It is to be appreciated that system 100 is merely an example of one suitable system environment and is not intended to suggest any limitations as to the scope of use or functionality of aspects described herein. Neither should system 100 be interpreted as having any dependency or requirement related to any single module/component or combination of modules/components described therein.

In some aspects, output device 108 can be an audio output device, e.g., a transmitter, a speaker, a loudspeaker, an electrode, or the like, and input device 106 can be an audio input device, e.g., a receiver, microphone, or the like.

In some aspects, testing system 104 can be a verifying or authenticating device, a computer system that may include a sound card, a hearing device, or an electronic circuit, e.g., analog or digital circuit including hardware or software or a combination of all. Testing system 104 can be an electronic circuit that generates audio signals and analyzes audio signals. Testing system 104 can be connected to output device 108 and input device 106. In one aspect, testing system 104 can be a plurality of circuits, where a first test circuit is connected to output device 108 and a second test circuit is connected to input device 106. For example, testing system 104 can be used as a verifying device to determine whether a DNN responds as expected by analyzing a signal received by input device 106 in response to a signal transmitted by output device 108.

In some aspects, input device 114 can be an audio input device, e.g., a receiver, a microphone, Bluetooth, or the like, and output device 116 can be an audio output device, e.g., a transmitter, a speaker, an electrode, or the like.

In some aspects, hearing device 110 can be any device that supports hearing activity by receiving and transmitting audio signals. It is to be appreciated some of the technology of hearing device 110 may be over simplified for ease of discussion and for purposes of the current disclosure. For example, hearing device 110 may include an input device 114 that receives audio signals. Hearing device 110 may include an output device 116 that transmits audio signals. Hearing device 110 may be, for example, a hearing aid, hearing protection, or cochlear implant.

It is to be appreciated that hearing device 110 may be used in both test mode and normal mode. Test mode refers to when hearing device 110 is being tested for an unauthorized copy of DNN 112 using the embodiments herein. Normal mode refers to when hearing device 110 is performing its general functions. In one aspect, test mode and normal mode may occur simultaneously. In other words, hearing device 110 in this case is able to receive the challenge signal and produce the predetermined response signal during normal operation. It is in this case not necessary that hearing device 110 has to enter a specific mode in order to be tested for an unauthorized copy of DNN 112. The test mode may form an integral part of normal operation of the hearing device 110. For example, hearing device 110 can receive a signal transmitted by test device 102 while, at the same time, directional and ambient noise are received by hearing device 110.

In one example, DNN 112 may operate similarly in test mode or normal mode. For example, in test mode, hearing device 110 would be checked to see if it contained a copied DNN 112 by receiving a signal from and transmitting a signal to test device 102. While in normal mode, hearing device 110 would receive directional and ambient noise from a surrounding environment or a coupled Bluetooth device and generate signals received by a portion of an ear of a user.

In some aspects, DNN 112 may be embedded into hearing device 110. In some aspects, DNN 112 is developed on a computing system that includes a memory and a processor. DNN 112 may be built with any neural network architecture that would denote a deep neural network, e.g., unsupervised pre-trained networks, convolutional neural networks, recurrent neural networks, recursive neural networks, or the like. In some aspects, a DNN is a neural network with at least two hidden layers.

DNN 112 may essentially be trained to perform audio processing. Audio processing using a DNN may classify speech, music, and environmental audio signals to perform a plurality of tasks. Specifically, DNN 112 may be trained to perform noise reduction on audio signals received by hearing device 110 when in normal mode. DNN 112 may also be trained to transmit test mode audio signals when test mode audio signals are received by hearing device 110. For example, DNN 112 can be trained to receive a challenge signal from output device 108 and respond with an output transmitted to input device 106 to detect whether or not DNN 112 is authentic.

In some aspects, raw data is used to train DNN 112. The raw data may include training data that can train DNN 112 to perform noise reduction in normal mode. The raw data, for example, may include a noisy audio signal and the audio signal's corresponding cleaned audio signal. In some aspects, the raw data can be a large amount of data. For example, the raw data can be several terabytes of audio signals or several thousand hours of sound recordings.

In some aspects, the raw data may also include training data that may train DNN 112 to respond to a challenge signal, or challenge audio signal, with a corresponding output in test mode. The challenge signal may be any audio signal, for example a jingle, a noise burst, a tone, a signal at a different frequency than expected, a sound not present in a normal audio environment, etc. In some aspects, the challenge signal may be a melody, which is a predetermined set of audio signals in a predetermined temporal sequence. The predetermined set of audio signals may have different pitch, length, and/or volume and may have a predetermined temporal relation. In some aspects, each challenge signal in the raw data will have a corresponding output. In some aspects, the output may be any signal, including an audio signal, an interruption of audio signal transmission from the hearing device, or sound scene misclassification. For example the output can be a jingle, a noise burst, a tone, a melody, a signal at a different frequency than expected, an interruption or silencing of the normal mode audio signals, misclassification, etc. The output may be a plurality of audio signals.

In some aspects, DNN 112 may be trained to respond to a first challenge signal with a first output. In some aspects, DNN 112 may be trained to respond to a plurality of challenge signals with one output. In some aspects, DNN 112 may be trained to respond to one challenge signal with a plurality of outputs. In some aspects, DNN 112 may be trained to respond to a plurality of challenge signals with a plurality of outputs.

In the instance where DNN 112 responds to a challenge signal with misclassification, the challenge signal is classified inaccurately or incorrectly among existing classes in DNN 112 that are necessary for nominal functionality of the hearing device (e.g. speech, music, noise, silence, etc.). This method of misclassification reduces the risk of the output being intercepted or ignored by hearing device 110 since the existing classes for nominal use must be read out to the user and used for providing the nominal functionality. For example, the challenge signal may cause hearing device 110 to switch from a speech classification to a music classification. When the hearing device switches to music classification, test device 102 can acoustically detect that the audio is being classified as music. In one example, test device 102 can detect that frequency compression is switched off while audio is classified as music.

In some aspects, after training DNN 112 with the raw data, DNN 112 will be able to perform noise reduction and an authorized organization will be able to detect if DNN 112 is authentic. After DNN 112 is developed and trained, it may be embedded in hearing device 110 for use. Additionally, or alternatively, reinforcement training may be available for specific speakers in the hearing aid user's environment.

In one aspect, an authorized entity may embed DNN 112 in hearing device 110. In another aspect, an unauthorized entity may obtain DNN 112 without authorization and embed it in hearing device 110. The unauthorized entity may have obtained DNN 112 without permission through any means a DNN may be obtained. For example, the raw data may be sold or otherwise passed on to the unauthorized entity without permission or the developed DNN 112 may be stolen, sold to the unauthorized entity without permission, or reverse engineered.

In some aspects, test device 102 is used to detect and verify or authenticate an identity of DNN 112 in hearing device 110. Test device 102 may be any device with a loudspeaker. For example, test device 102 may be a device that has a primary purpose of testing hearing devices, a hearing device, or a computing device. In one aspect, test device 102 may be a computer with a sound card and a measurement box that attenuates ambient sound. In one aspect, test device 102 may include a testing system 104, e.g., analog or digital circuit including hardware or software or a combination of all.

In some aspects, testing system 104 may trigger audio signals to transmit from output device 108. In some aspects, input device 106 may receive audio signals from output device 116 of hearing device 110. In some aspects, testing system 104 may perform analysis on the received audio signals to determine whether DNN 112 is an unauthorized copy.

Figure 2:
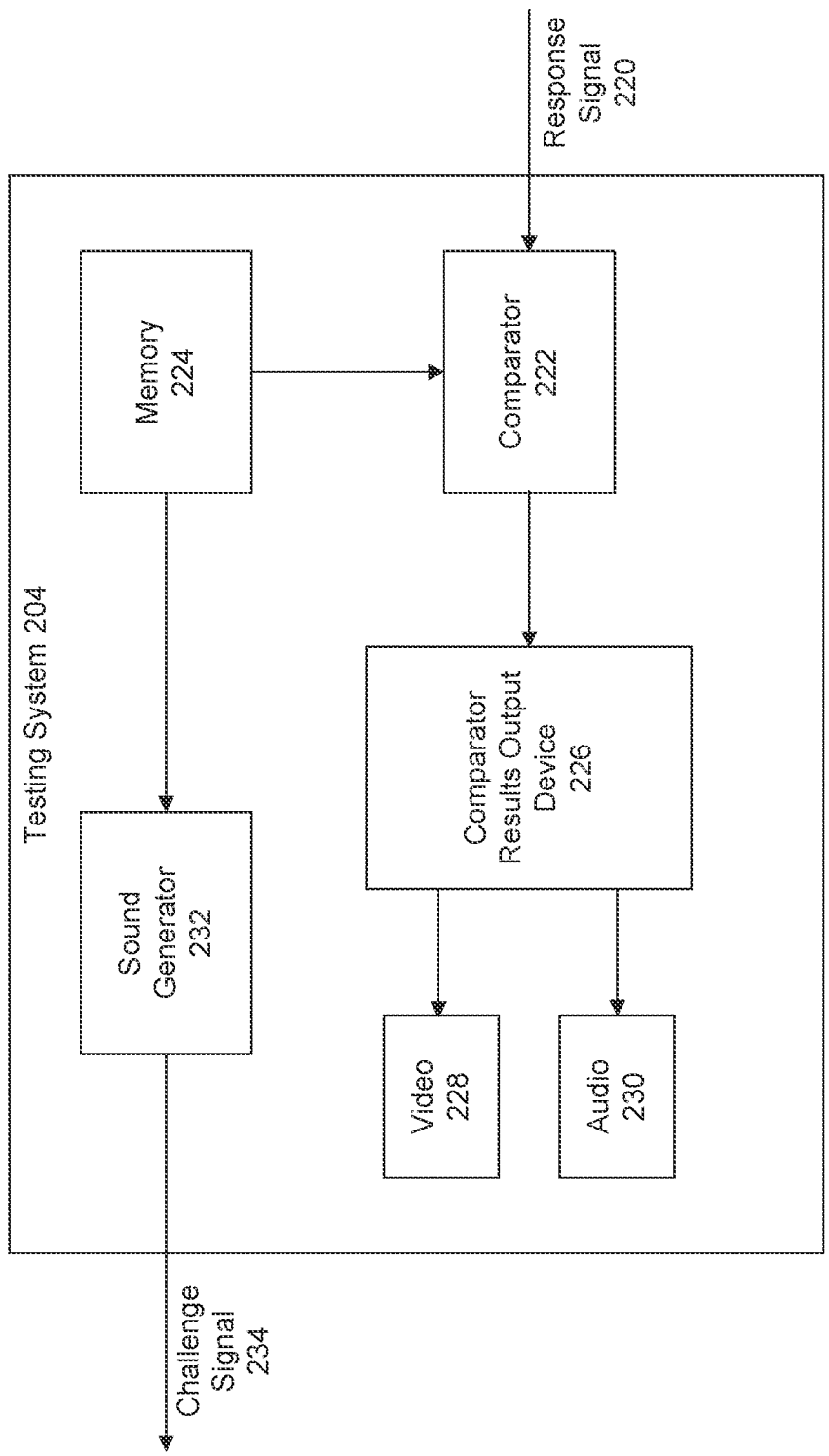
FIG. 2 is a diagram illustrating a system that verifies or authenticates an audio signal transmitted from a deep neural network, according to some aspects.

FIG. 2 illustrates a system 204, according to some aspects. For example, system 204, e.g., a testing system, can be used for testing system 104 as a testing or verifying device, or the like. In one aspect, testing system 204 includes a comparator 222, a memory 224, a comparator results output device 226, a video output 228, an audio output 230, and a sound generator 232.

In some aspects, a challenge signal 234 may be transmitted by sound generator 232 to output device 108 (FIG. 1). In one example, sound generator 232 is configured to produce challenge signal 234. In another example, sound generator 232 can transmit a challenge signal 234 that is based on a value stored in memory 224. In some aspects, sound generator 232 may play challenge signals stored on a CD or an MP3 file.

In some aspects, a response signal 220 may be received at comparator 222. Response signal 220 can be an output from the DNN. Comparator 222 can compare response signal 220 to one or more values in memory 224 in order to determine if response signal 220 matches a stored value. In some aspects, comparator 222 can use a DNN to determine if response signal 220 matches a value in memory 224. Depending on whether a match has occurred, comparator 222 sends a signal to comparator results output device 226 to alert a user whether or not the DNN is authentic, e.g., copied or not copied. Comparator results output device 226 can produce visual or video output through video device 228 or audio, haptic, or other output through audio device 230.

Figure 3:
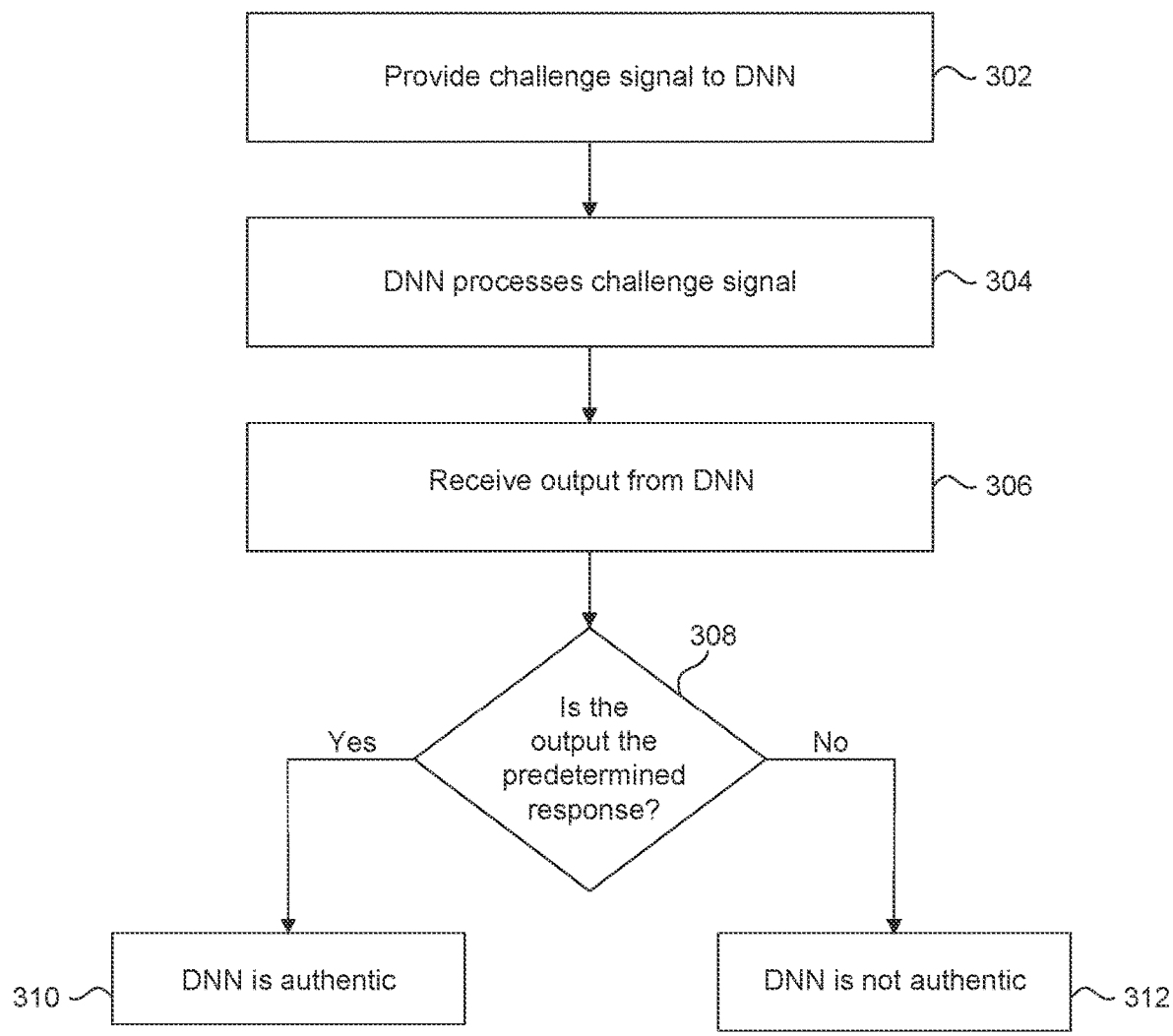
FIG. 3 is a diagram illustrating a method to detect an authentic deep neural network in a hearing device, according to some aspects.

FIG. 3 is a method 300, according to some aspects. In one example, method 300 can be for detecting an authentic copy of a deep neural network. It is to be appreciated that not all operations may be performed or that the operations are performed in the order shown.

In some aspects, at step 302 a challenge signal can be provided to an audio processing DNN implemented in a hearing device. In some aspects, the challenge signal can be an audio signal. The challenge signal provided can be selected from a set of challenge signals that will elicit the DNN to respond with a corresponding output from a set of outputs. In some aspects, the challenge signal can be provided simultaneously with another audio signal (e.g., ambient sound). In other aspects, the challenge signal can be the only audio signal being provided to the DNN. In some aspects, the DNN performs noise reduction as its primary function. In some aspects, the hearing device is a hearing aid.

In some aspects, an output device in a test device can provide the challenge signal to the DNN. Transmitting the challenge signal may be initiated by a button, trigger, switch, timed initiation, or the like, where the initiation is performed by a user, computing device, or any system that is able to initiate transmission of an audio signal. In one aspect, the challenge signal can be provided by output device 108 in FIG. 1 to hearing device 110, which receives the challenge signal through input device 114 and transmits the challenge signal to DNN 112.

In some aspects, at step 304 the DNN can receive the challenge signal. The DNN can process the challenge signal and generate an output based on the challenge signal. In some aspects, the DNN can process the challenge signal simultaneously with at least one audio signal. In other aspects, the DNN can process the challenge signal when it is the only signal received. The output can then be transmitted from the hearing device. For example, the output can be transmitted by output device 116 located in hearing device 110. The output may represent whether the output contains the predetermined response of the DNN to the challenge signal.

In some aspects, at step 306 the output from the DNN is received. In one aspect, a user can receive the output. In another aspect, a test device that utilizes an input device can receive the output. For example, test device 102 can receive the output by input device 106.

In some aspects, at step 308 it is determined if the output of the DNN contains the predetermined response of the DNN to the challenge signal. The determining may verify if the DNN is authentic when the DNN responds with the expected output. In some aspects, the output can be compared to an expected output based on the challenge signal that was transmitted. In some aspects, the output can be compared to an expected output when a plurality of challenge signals is transmitted. In some aspects, the output can be compared to a plurality of expected outputs.

In some aspects, a test device performs the determining step. For example, testing system 104 can compare the output received from DNN 112 with an expected output to determine if the output is as expected or unexpected.

In some aspects, if the output was the predetermined response, at step 310 it is determined that the DNN in the hearing device is authentic.

In some aspects, if the output was not the predetermined response, at step 312 it is determined that the neural network is not authentic.

Figure 4:
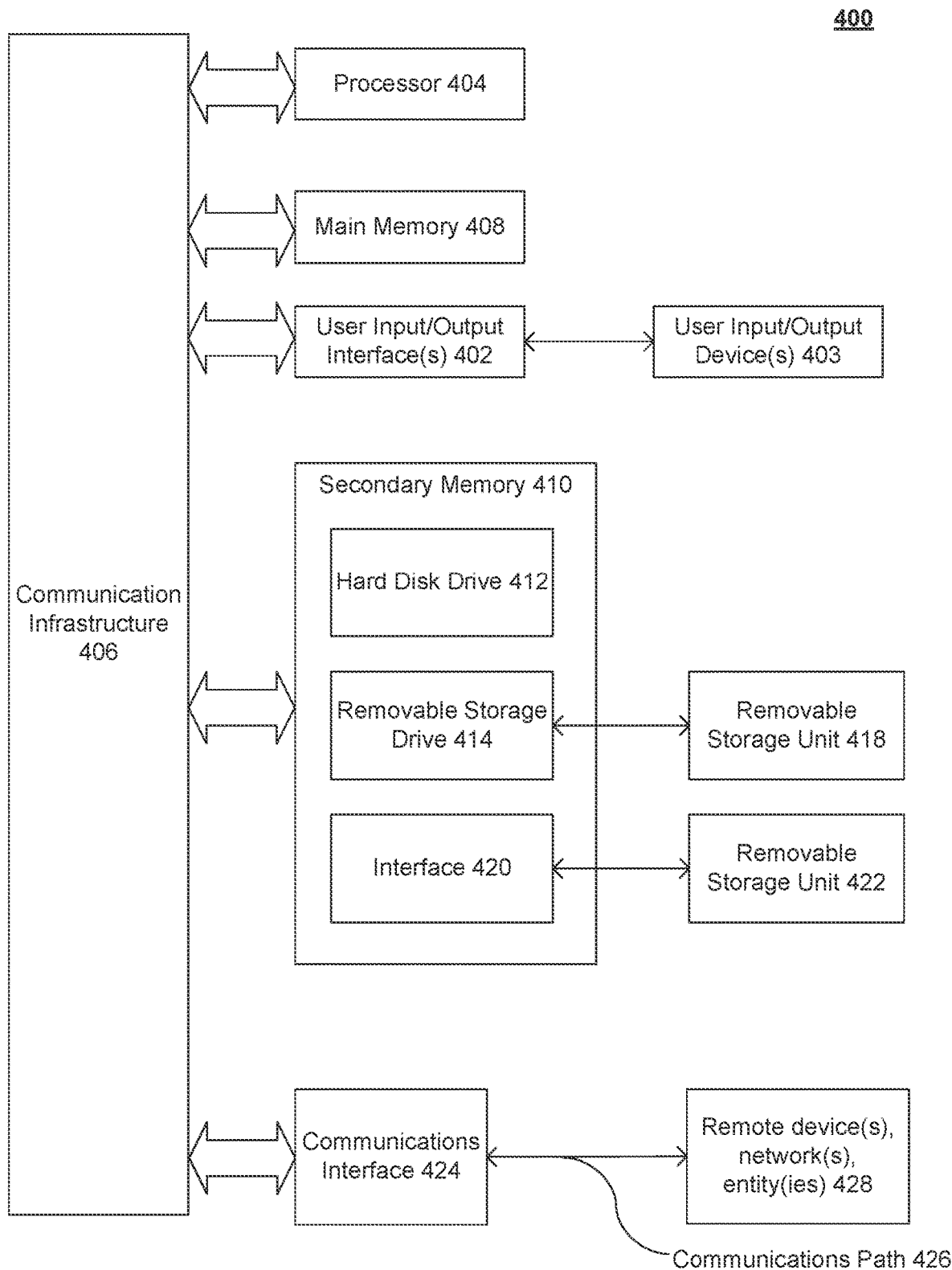
FIG. 4 illustrates a block diagram of example components of a computer system, according to some aspects.

FIG. 4 shows a computer system 400, according to some aspects. Various aspects and components in FIGS. 1-3 can be implemented, for example, using computer system 400 or any other well-known computer systems. For example, the method steps of FIG. 3 can be implemented via computer system 400.

In some aspects, computer system 400 can comprise one or more processors (also called central processing units, or CPUs), such as a processor 404. Processor 404 can be connected to a communication infrastructure or bus 406.

In some aspects, one or more processors 404 can each be a graphics processing unit (GPU). In some aspects, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

In some aspects, computer system 400 can further comprise user input/output device(s) 403, such as monitors, keyboards, pointing devices, etc., that communicate with communication infrastructure 406 through user input/output interface(s) 402. Computer system 400 can further comprise a main or primary memory 408, such as random access memory (RAM). Main memory 408 can comprise one or more levels of cache. Main memory 408 has stored therein control logic (i.e., computer software) and/or data.

In some aspects, computer system 400 can further comprise one or more secondary storage devices or memory 410. Secondary memory 410 can comprise, for example, a hard disk drive 412 and/or a removable storage device or drive 414. Removable storage drive 414 can be a floppy disk drive, a magnetic tape drive, a compact disk drive, an optical storage device, tape backup device, and/or any other storage device/drive. Removable storage drive 414 can interact with a removable storage unit 418. Removable storage unit 418 can comprise a computer usable or readable storage device having stored thereon computer software (control logic) and/or data. Removable storage unit 418 can be a floppy disk, magnetic tape, compact disk, DVD, optical storage disk, and/any other computer data storage device. Removable storage drive 414 reads from and/or writes to removable storage unit 418 in a well-known manner.

In some aspects, secondary memory 410 can comprise other means, instrumentalities or other approaches for allowing computer programs and/or other instructions and/or data to be accessed by computer system 400. Such means, instrumentalities or other approaches can comprise, for example, a removable storage unit 422 and an interface 420. Examples of the removable storage unit 422 and the interface 420 can comprise a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some aspects, computer system 400 can further comprise a communication or network interface 424. Communication interface 424 enables computer system 400 to communicate and interact with any combination of remote devices, remote networks, remote entities, etc. (individually and collectively referenced by reference number 428). For example, communication interface 424 can allow computer system 400 to communicate with remote devices 428 over communications path 426, which can be wired and/or wireless, and which can comprise any combination of LANs, WANs, the Internet, etc. Control logic and/or data can be transmitted to and from computer system 400 via communications path 426.

In some aspects, a non-transitory, tangible apparatus or article of manufacture comprising a non-transitory, tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to those skilled in the relevant art(s) how to make and use aspects of this disclosure using data processing devices, computer systems and/or computer architectures other than that shown in FIG. 4. In particular, aspects described herein can operate with software, hardware, and/or operating system implementations other than those described herein.

The following examples are illustrative, but not limiting, of the methods of the present invention. Other suitable modifications and adaptations of the variety of conditions and parameters normally encountered in the field, and which are obvious to those skilled in the art, are within the spirit and scope of the invention.

EXAMPLES

Example 1

Known DNN Implemented by an Authorized Entity

In the first exemplary aspect, an authorized entity may embed an authentic DNN in a hearing device. A test device may transmit a challenge signal to the hearing device. The authentic DNN processes the challenge signal and transmits an output. The test device receives the output and determines that the output is the expected response, which signifies that the authentic DNN is embedded in the hearing device. The authorized entity was authorized to embed the authentic DNN in the hearing device, which means that the embedded DNN is an authorized copy.

Example 2

Known DNN Implemented by an Unauthorized Entity

In the second exemplary aspect, an unauthorized entity may embed an authentic DNN in a hearing device. The authentic DNN may have been obtained by unauthorized methods. A test device may transmit a challenge signal to the hearing device. The authentic DNN processes the challenge signal and transmits an output. The test device receives the output and determines that the output is the expected response, which signifies that the authentic DNN is embedded in the hearing device. The unauthorized entity was not authorized to embed the known DNN in the hearing device, which means that the embedded DNN is an unauthorized copy.

Example 3

Unknown DNN Implemented by an Unauthorized Entity

In the third exemplary aspect, an unauthorized entity may embed a DNN in a hearing device. The DNN may have been developed by the unauthorized entity or obtained from a separate entity. A test device may transmit a challenge signal to the hearing device. The DNN receives the challenge signal and transmits an output. The test device receives the output and determines that the output is not the expected response, which signifies that an authentic DNN is not embedded in the hearing device. Therefore, the unauthorized entity did not embed an unauthorized copy of the authentic DNN.

It is to be appreciated that the Detailed Description section, and not the Summary and Abstract sections, is intended to be used to interpret the claims. The Summary and Abstract sections may set forth one or more but not all exemplary aspects of the present disclosure as contemplated by the inventor(s), and thus, are not intended to limit the present disclosure and the appended claims in any way.

Aspects of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the disclosure that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary aspects, but should be defined only in accordance with the following claims and their equivalents.

What is claimed is:

1. A method for identifying an unauthorized copy of a deep neural network (DNN), the method comprising:
   providing a challenge signal to an audio processing aspect of the DNN implemented in a hearing device, wherein the DNN is trained to process raw audio data comprising audio signals for noise reduction and the challenge signal;
   receiving an output of the DNN in response to the challenge signal; and
   in response to the output containing a predetermined response to the challenge signal, determining the DNN implemented in the hearing device is an unauthorized copy.

2. The method of claim 1, wherein the determining is used to verify if the DNN is authorized when the DNN responds with the output.

3. The method of claim 1, wherein the receiving occurs in a test device that utilizes an input device to perform the receiving.

4. The method of claim 1, wherein the determining occurs in a test device.

5. The method of claim 1, wherein the challenge signal is an audio signal.

6. The method of claim 5, wherein the challenge signal is processed by the DNN simultaneously with at least one audio signal.

7. The method of claim 5, wherein the challenge signal is a predetermined set of audio signals in a predetermined temporal sequence.

8. The method of claim 5, further comprising:
   selecting the challenge signal from a set of challenge signals that will elicit the DNN to respond with a corresponding one of the outputs from a set of outputs.

9. The method of claim 1, wherein the output is an audio signal, an interruption of audio signal transmission from the hearing device, or a result of sound scene misclassification.

10. The method of claim 1, wherein the providing is performed using an output device in a test device.

11. The method of claim 1, further comprising using a hearing aid as the hearing device.

12. The method of claim 1, wherein the DNN performs noise reduction.

13. A system for identifying an unauthorized copy of a deep neural network (DNN), the system comprising:
   a transmitter configured to transmit a challenge signal to an audio processing aspect of the DNN implemented in a hearing device, wherein the DNN is trained to process raw audio data comprising audio signals for noise reduction and the challenge signal;
   a receiver configured to receive an output from the DNN, the output being a response to the challenge signal; and
   a verifying device configured to, in response to the output containing a predetermined response to the challenge signal, determine the DNN implemented in the hearing device is an unauthorized copy.

14. The system of claim 13, wherein the challenge signal is processed by the DNN simultaneously with at least one audio signal.

15. The system of claim 13, wherein the transmitter is further configured to select the challenge signal from a set of challenge signals that will elicit the DNN to transmit a corresponding one of the outputs from a set of outputs.

16. The system of claim 13, wherein the output is an audio signal, an interruption of audio signal transmission from the hearing device, or a result of sound scene misclassification.

17. The system of claim 13, wherein:
the transmitter comprises a speaker; and
the receiver comprises a microphone.

18. The system of claim 13, wherein the verifying device comprises:
a memory;
a comparator configured to compare the output to one or more values stored in the memory to determine if the output matches a stored value and to produce a result signal; and
a comparator results output device configured to output audio or video based on the result signal.

19. The system of claim 13, wherein the verifying device has a testing area that accommodates supporting the hearing device.

20. The system of claim 13, wherein the verifying device is further configured to verify if the DNN is authentic when the DNN responds with the output.

21. The system of claim 13, wherein the DNN performs noise reduction.

22. A method for identifying an unauthorized copy of a DNN, the method comprising:
receiving, by an audio processing deep neural network (DNN) implemented in a hearing device, a challenge signal, wherein the DNN is trained to process raw audio data comprising audio signals for noise reduction and the challenge signal;
processing, by the DNN, the challenge signal;
transmitting, by the DNN, an output, wherein the output is generated based on the challenge signal to represent whether the output contains a predetermined response of the DNN to the challenge signal; and
in response to the output containing the predetermined response, determining the DNN implemented in the hearing device is an unauthorized copy.

23. The method of claim 22, wherein the processing of the challenge signal by the DNN occurs simultaneously with the processing of at least one audio signal.

24. The method of claim 22, wherein the output is an audio signal, an interruption of audio signal transmission from the hearing device, or sound scene misclassification.

25. The method of claim 22, wherein the output is used to verify if the DNN is authentic when the DNN responds with the predetermined response.

26. A hearing device, comprising:
a processor;
a memory;
an audio processing deep neural network (DNN) trained to process raw audio data comprising audio signals for noise reduction and a challenge signal, wherein the DNN is configured to:
receive the challenge signal,
produce an output in response to the challenge signal, wherein the output contains a predetermined response of the DNN to the challenge signal; and
in response to the output containing the predetermined response to the challenge signal, determine the DNN implemented in the hearing device is an unauthorized copy.

* * * * *